US008170393B2

(12) United States Patent
Nishi (10) Patent No.: US 8,170,393 B2
(45) Date of Patent: May 1, 2012

(54) DIGITAL BROADCAST REPRODUCTION DEVICE AND DIGITAL BROADCAST RECORDING DEVICE

(75) Inventor: Tatsuya Nishi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1301 days.

(21) Appl. No.: 11/813,994

(22) PCT Filed: Jan. 16, 2006

(86) PCT No.: PCT/JP2006/300437
§ 371 (c)(1),
(2), (4) Date: Jul. 13, 2007

(87) PCT Pub. No.: WO2006/077791
PCT Pub. Date: Jul. 27, 2006

(65) Prior Publication Data
US 2009/0074385 A1 Mar. 19, 2009

(30) Foreign Application Priority Data

Jan. 18, 2005 (JP) .................................. 2005-010674

(51) Int. Cl.
*H04N 5/77* (2006.01)
(52) U.S. Cl. .......................... 386/224; 386/225; 386/226
(58) Field of Classification Search .................. 386/224, 386/226
See application file for complete search history.

(56) References Cited

U.S. PATENT DOCUMENTS

| 7,174,126 B2 * | 2/2007 | McElhatten et al. ......... 455/3.04 |
| 2005/0015803 A1 * | 1/2005 | Macrae et al. ................... 725/41 |

FOREIGN PATENT DOCUMENTS

| JP | 2001008176 A | 1/2001 |
| JP | 2003061036 A | 2/2003 |
| JP | 2004140675 A | 5/2004 |
| JP | 2004236053 A | 8/2004 |
| JP | 2005005867 A | 1/2005 |

\* cited by examiner

*Primary Examiner* — Jamie Atala
(74) *Attorney, Agent, or Firm* — Seed IP Law Group PLLC (57) ABSTRACT

There is disclosed a digital broadcast recording/reproduction device capable of easily searching for an updated data broadcast. In this device, a data broadcast update recording unit (125) receives an event message and a report on a module modification from a data broadcast reproduction unit (111) and, by analyzing the contents reported, it records the updated information and the update time in a data accumulation unit (109). When a whole control unit (122) receives a rewinding request from an input control unit (121), a reproduction control unit (127) is controlled so that the reproduction control unit (127) reproduces a data broadcast from the updated portion recorded in the data accumulation unit (109).

20 Claims, 7 Drawing Sheets

DIGITAL BROADCAST REPRODUCTION DEVICE AND DIGITAL BROADCAST RECORDING DEVICE

TECHNICAL FIELD

The present invention relates to a digital broadcast playback apparatus and digital broadcast recording apparatus. More particularly, the present invention relates to a digital broadcast playback apparatus and digital broadcast recording apparatus that cue broadcast data.

BACKGROUND ART

For a recording apparatus that records TV broadcasting, a method of adding index information to recorded programs and playing back the programs in an order of a user's request is typically known. Patent Document 1 and Patent Document 2 disclose arts of this kind of method.

Figure 1:
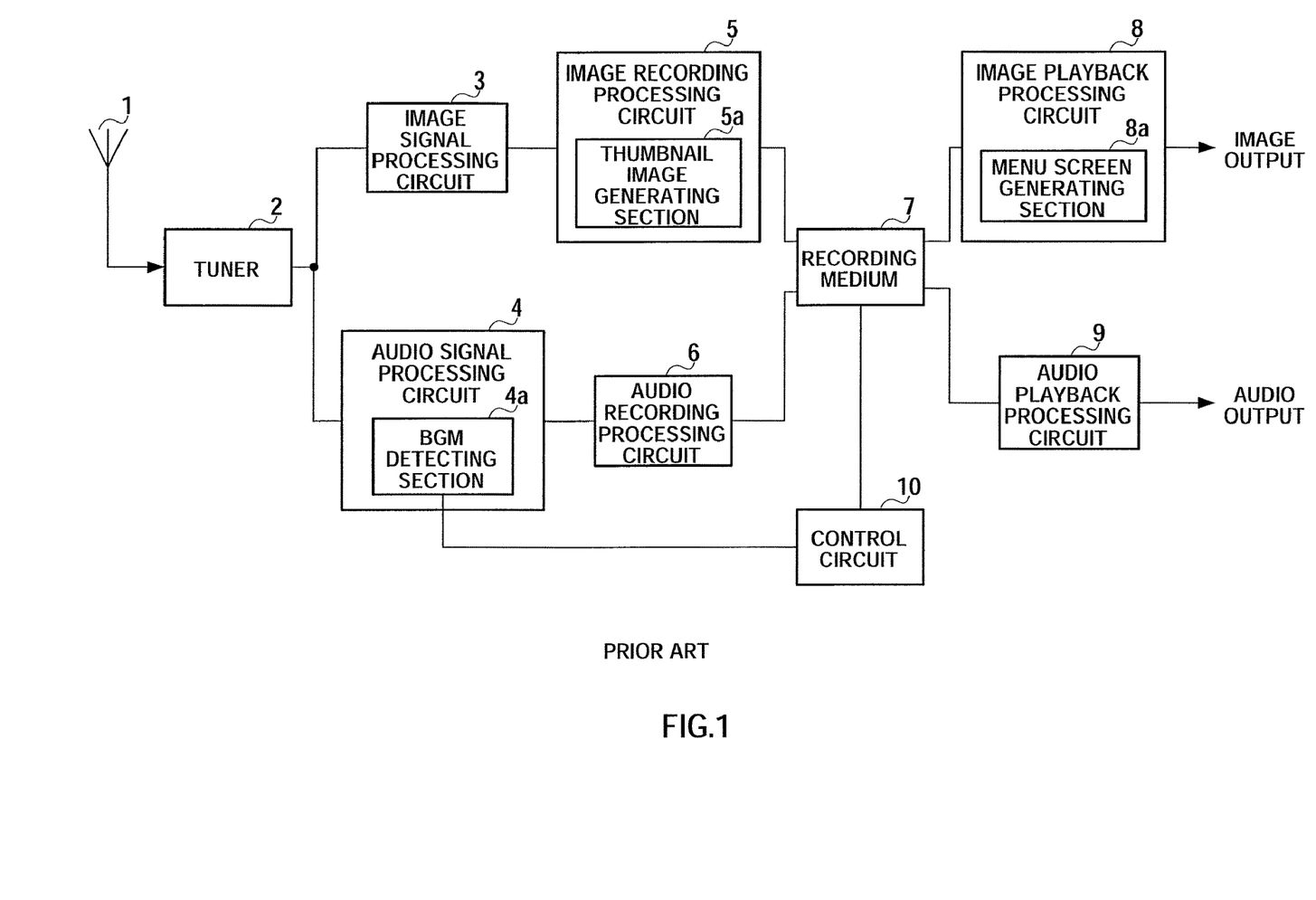
FIG. 1 is a block diagram showing a configuration of the recording apparatus disclosed in Patent Document 1.

As shown in FIG. 1, Patent Document 1 discloses a recording apparatus that records TV broadcasting in recording medium 7 such as DVD and HDD. In this apparatus, based on audio signals of received TV signals, BGM detecting section 4a detects an audio signal of BGM and detects a change in the audio signal when BGM switches. Then, data (for example, time data) indicating start of the BGM and switching of the BGM based on the detected audio signal, and received TV signals are automatically stored in recording medium 7. By this means, it is possible to detect an exciting scene and important scene in a program at ease and skip to and play back (cue) the detected scene at ease.

Figure 2:
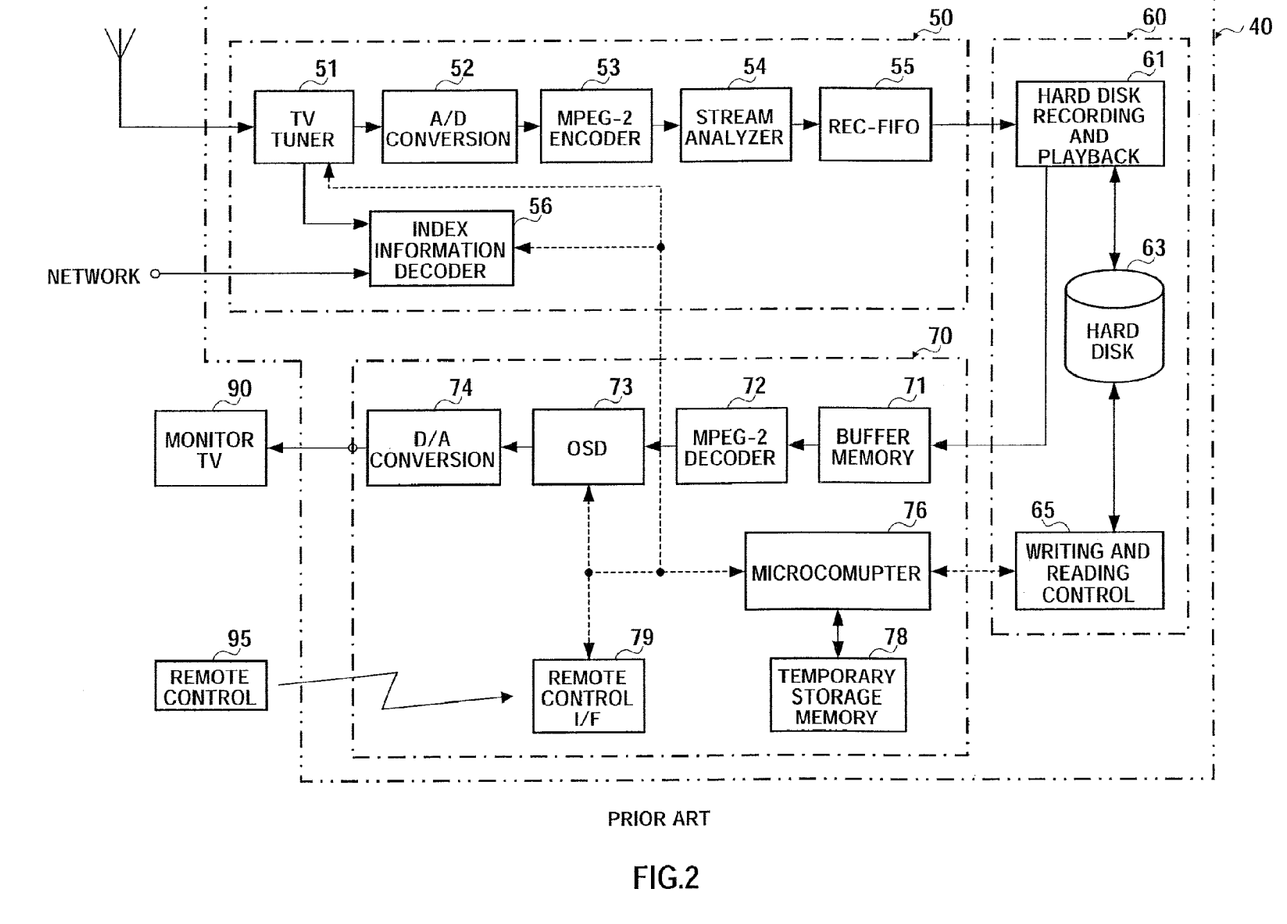
FIG. 2 is a block diagram showing a configuration of the program recording signal playback apparatus disclosed in Patent Document 2.

Further, as shown in FIG. 2, Patent Document 2 discloses a recording apparatus that receives and records a broadcast program. With this apparatus, a user acquires information transmitted from a service center (not shown) using index information decoder 56 based on content information according to the received program and reception start time information of the program. Remote control I/F section 79 sets playback or skip playback of the recorded program based on the content information, and writing and reading control section 65 accesses and plays back the part where the program is recorded and a playback is set based on time information included in index information. By this means, it is possible to skip playback of a CM part in the program and cue a specific performer and a specific scene at ease.

Patent Document 1: Japanese Patent Application Laid-Open No. 2004-140675
Patent Document 2: Japanese Patent Application Laid-Open No. 2003-061036

DISCLOSURE OF THE INVENTION

Problems to be Solved by the Invention

However, with the arts disclosed in the above-described Patent Document 1 and Patent Document 2, recording of broadcast data included in digital broadcasting is not taken into consideration. Therefore, if broadcast data is updated, or a display state is changed in the same program by an event message, it is difficult to find the updated data broadcast content in the recorded program. For example, even when broadcasting is played back in real time or the recorded broadcasting is played back from a beginning, it is difficult for the user to notice that part of a plurality of data broadcast contents is updated or changed by an event.

It is therefore an object of the present invention to provide a digital broadcast playback apparatus and digital broadcast recording apparatus that enable search for updated broadcast data at ease.

Means for Solving the Problem

The digital broadcast playback apparatus of the present invention adopts a configuration having: a data broadcast update searching section that, when a request for cueing broadcast data is acquired, searches for an updating event of the broadcast data; and a playback section that starts a playback from the updating event searched for by the data broadcast update searching section.

The digital broadcast recording apparatus of the present invention adopts another configuration having: a detecting section that detects an updating event of broadcast data; and a recording section that records broadcasting including the broadcast data and records as updating event information details of an updating event of the data broadcast content by the updating event detected by the detecting section associated with a cue point of recorded data where the updating event occurs.

Advantageous Effect of the Invention

According to the present invention, it is possible to provide a digital broadcast playback apparatus and digital broadcast recording apparatus that enable search for updated broadcast data at ease.

BEST MODE FOR CARRYING OUT THE INVENTION

Now, embodiments of the present invention will be described in detail with reference to the accompanying drawings.

Embodiment

Figure 3:
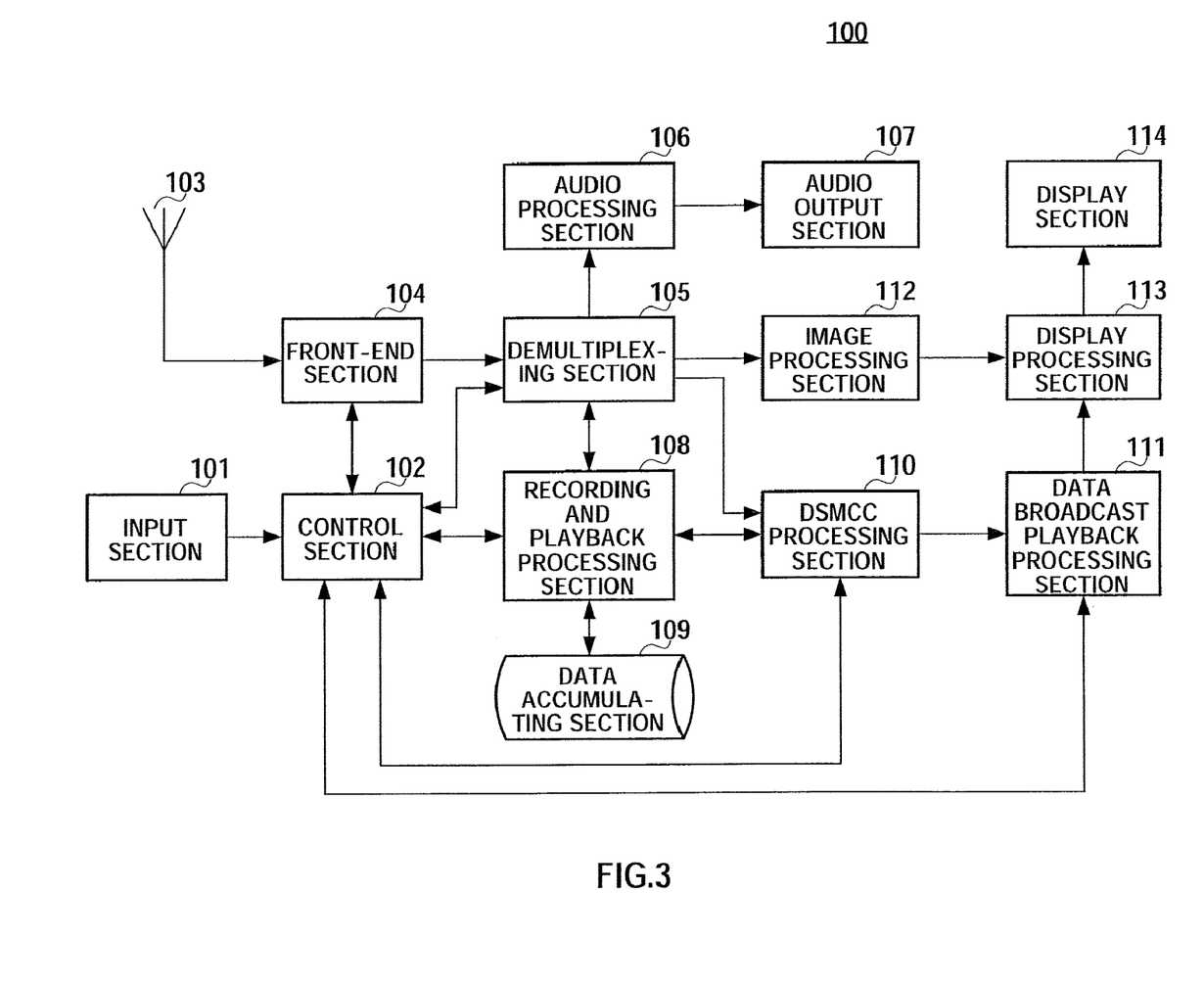
FIG. 3 is a block diagram showing a configuration of a digital broadcast recording and playback apparatus according to an embodiment of the present invention.

FIG. 3 is a block diagram showing a configuration of digital broadcast recording and playback apparatus 100 according to an embodiment of the present invention. In this figure, input section 101 has button keys or the like, and a user operates the button keys and inputs commands for playback, recording, selecting channel and cueing and so on, to control section 102.

Control section 102 receives the commands from input section 101, controls the sections inside digital broadcast recording and playback apparatus 100 and thereby performs playback, recording, channel selection and cueing. Details of control section 102 will be described later.

Front-end section (tuner and demodulator) 104 extracts a frequency signal of the channel specified by a user from a broadcast wave received via antenna 103 using input section 101 and performs code demodulating processing on the extracted frequency signal. The signal subjected to code demodulating processing is outputted to demultiplexing section 105 and control section 102.

When receiving a request for playing back received content from control section 102, demultiplexing section 105 demultiplexes a signal outputted from front-end section 104 to image information, audio information, data broadcast content, and the like. When receiving a request for playing back recorded content from control section 102, demultiplexing section 105 acquires recorded content through recording and playback processing section 108 described later and demultiplexes the acquired content to image information, audio information, data broadcast content, and the like. The demultiplexed image information, audio information and data broadcast content are outputted to image processing section 112, audio processing section 106 and DSMCC processing section 110, respectively. Further, when receiving a recording request from control section 102, demultiplexing section 105 does not demultiplex a signal outputted from front-end section 104 and outputs the signal to recording and playback processing section 108 in a transport stream state.

Audio processing section 106 decodes the signal outputted from demultiplexing section 105—an audio stream encoded using AAC (Advanced Audio Coding) which is an audio compression scheme of MPEG-2—and outputs the decoded signal to audio output section 107. Audio output section 107 outputs the audio outputted from audio processing section 106.

When receiving a recording request from control section 102, recording and playback processing section 108 acquires the transport stream outputted from demultiplexing section 105, and accumulates the acquired transport stream in data accumulating section 109. Further, when receiving a request for playing back recorded content from control section 102, recording and playback processing section 108 reads the accumulated transport stream from data accumulating section 109 and outputs the read transport stream to demultiplexing section 105.

Data accumulating section 109 is a nonvolatile memory or removable nonvolatile memory. A transport stream is accumulated in data accumulating section 109 by recording and playback processing section 108, and the accumulated transport stream is read from data accumulating section 109.

DSMCC (Digital Storage Media Command and Control) processing section 110 acquires a module (a unit configuring data carousel) of broadcast data transmitted based on a data carousel scheme which is a scheme of repeatedly transmitting data, from demultiplexing section 105 and constructs data broadcast content from the acquired module. The constructed data broadcast content is outputted to data broadcast playback processing section 111. Further, by acquiring data relating to broadcast data from demultiplexing section 105 and analyzing the acquired data broadcast content, DSMCC section 110 receives a report of an updating event of the broadcast data and transmits the report to control section 102, recording and playback processing section 108 and data broadcast playback processing section 111.

Here, an updating event of broadcast data will be described. Updating events of broadcast data include three types: updating events caused by reception of broadcast waves; updating events caused by user operation; and updating events caused by interrupt requests from external applications.

The updating events caused by reception of broadcast waves include start of the broadcast data, termination of the broadcast data, updating of data event (change of all data broadcast content that is being played back), updating of a module (change of part of data broadcast content that is being played back) and reception of event messages such as a synchronization message (which makes operation specified by this message to be performed immediately after the reception of this message) and a non-synchronization message (which makes operation to be performed at the time specified by this message).

The updating events caused by user operation include questionnaire input, form input including input of character strings in specified columns and selection of check boxes, such as polling, and link selection.

The updating events caused by interrupt requests from external applications include the case where a television application must interrupt a playback of image or audio by an interrupt request from an external application other than the television application. Specific examples of an external application include telephone and e-mail, and interrupt requests of these are made by an incoming call, outgoing call, call, call ending, e-mail reception, e-mail display, e-mail creation and alarm from a scheduler.

Data broadcast playback processing section 111 is a broadcast content display browser that displays BML (Broadcast Markup Language), and, when receiving a request for playing back broadcast data from control section 102, plays back data broadcast content outputted from DSMCC processing section 110 and outputs the played-back content to display processing section 113. Further, when data broadcast content is played back or stopped, data broadcast playback processing section 111 transmits an operation confirmation report to control section 102.

Image processing section 112 decodes an image stream outputted from demultiplexing section 105 and encoded based on H.264 (officially, H.264/AVC (Advanced Video Coding)) which is an advanced dynamic image compression scheme, and outputs the decoded signal to display processing section 113.

Display processing section 113 combines the image stream decoded by image processing section 112 and the content outputted from data broadcast playback processing section 111 and outputs the combined information to display section 114. Display section 114 displays the information outputted from display processing section 114.

Figure 4:
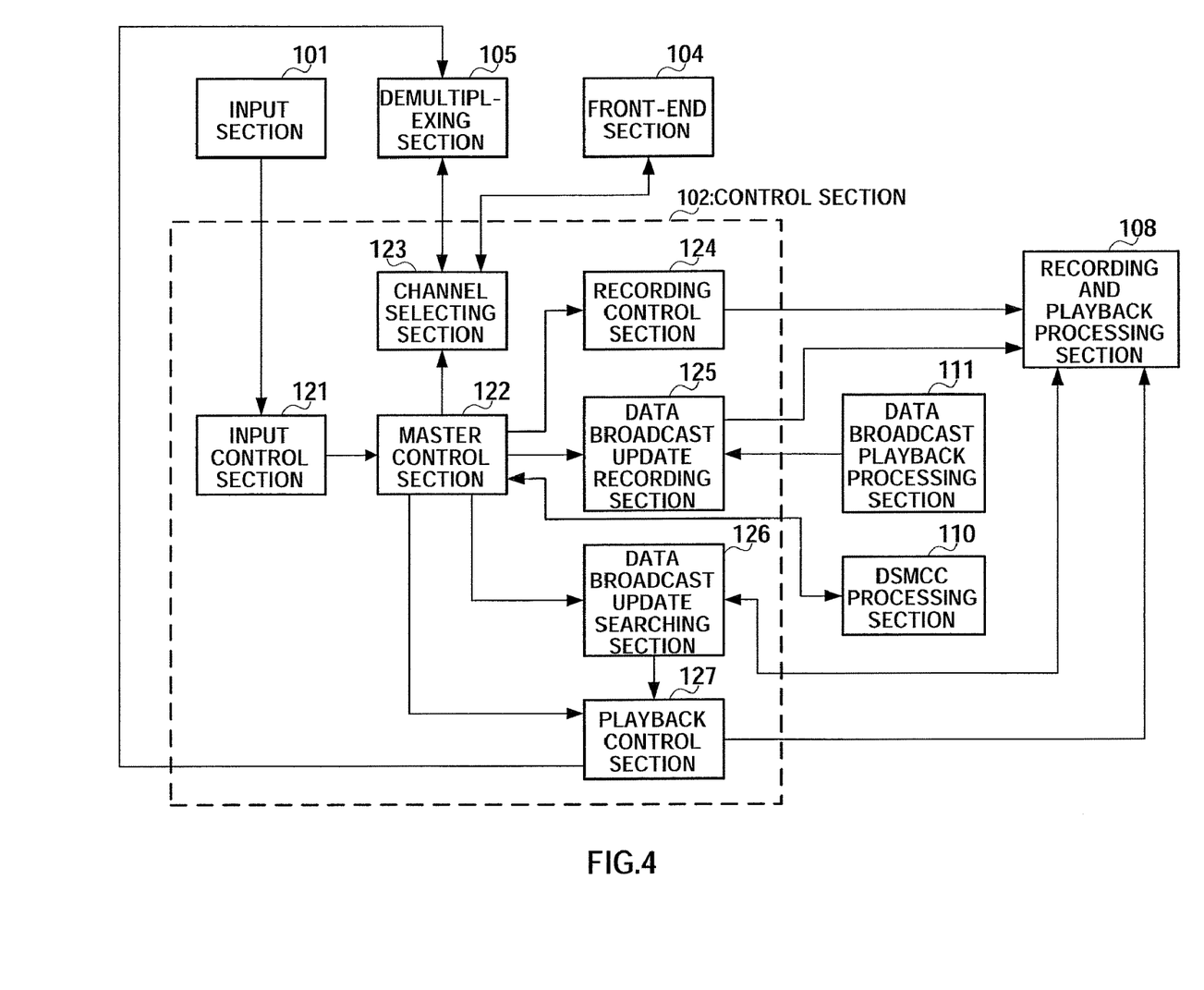
FIG. 4 is a block diagram showing the internal configuration of the control section shown in FIG. 3.

FIG. 4 is a block diagram showing the internal configuration of control section 102 shown in FIG. 3. In this figure, input control section 121 converts information to request information such as playback requests, recording requests, channel selection requests and requests for cueing according to details indicated by input section 101, and outputs the request information to master control section 122.

Master control section 122 controls channel selecting section 123, recording control section 124, data broadcast update recording section 125, DSMCC processing section 110, data broadcast update searching section 126 and playback control section 127 based on the request information outputted from input control section 121.

Channel selecting section 123 is controlled by master control section 122, sets a frequency channel to front-end section 104, and, when there is a broadcast wave (transport stream) which can be received in the set frequency channel, recognizes that frequency channel selection is successful, and outputs the transport stream as is from front-end section 104 to demultiplexing section 105. Further, channel selecting section 123 analyzes the data demultiplexed at demultiplexing section 105 and sets demultiplexing section 105 so as to extract streams such as image and audio of a specified service in the transport stream based on the service configuration of the transport stream obtained through analysis.

Recording control section 124 is controlled by master control section 122 and outputs a request such as start and stop of recording of a transport stream to recording playback processing section 108.

Data broadcast updating and recording section 125 is controlled by master control section 122, receives reports of various updating events such as an event message and updating of a module as described above from data broadcast playback processing section 111, and analyzes the reported details. Data broadcast updating and recording section 125 manages a position of the transport stream where an updating event occurs using a memory address of data accumulating section 109 and sets the position of the transport stream as a playback start position, that is, a cue point. Data broadcast update recording section 125 associates the details of the updating event with the position in the transport stream where this updating event occurs, sets the associated information as updating event information and requests recording playback processing section 108 to record the updating event information in data accumulating section 109.

Data broadcast update searching section 126 is controlled by master control section 122, acquires accumulated transport stream from data accumulating section 109 via recording and playback processing section 108, and searches for an updating event of broadcast data from the acquired transport stream. Data broadcast update searching section 126 requests playback control section 127 to perform playback from the searched updating event of broadcast data. In addition, when updating event information is recorded in data accumulating section 109, data broadcast update searching section 126 searches data accumulating section 109 for updating event information via recording and playback processing section 108 and requests playback control section 127 to perform a playback from the cue point of the transport stream indicated in the updating event information.

Playback control section 127 is controlled by master control section 122 and controls recording and playback processing section 108 and demultiplexing section 105 so that a playback is started from the updating event of broadcast data searched for by data broadcast update searching section 126. When a cue point of a transport stream is specified, a playback is started from the specified cue point.

Figure 5:
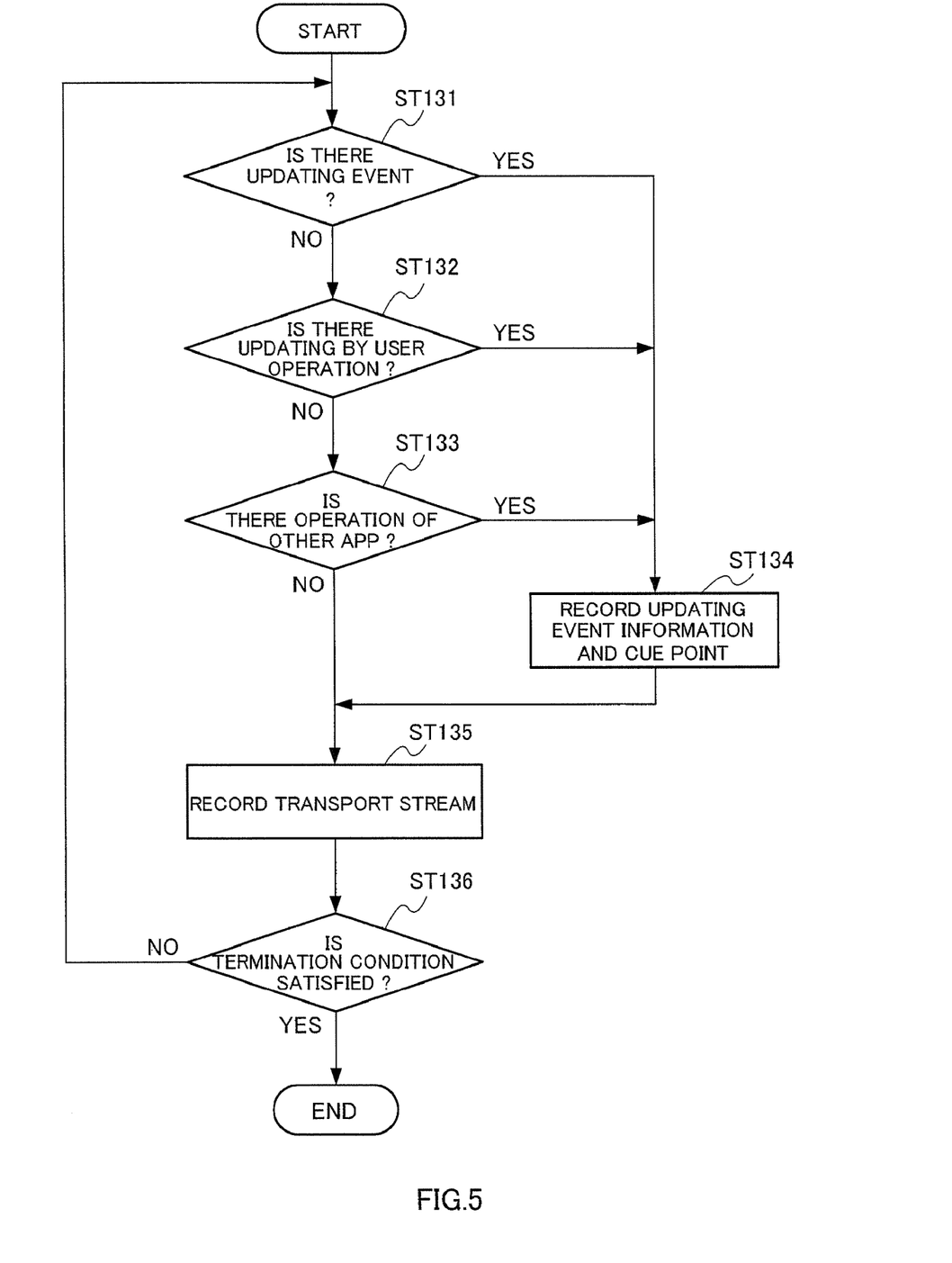
FIG. 5 is a flowchart showing steps of recording processing of the digital broadcast recording and playback apparatus shown in FIG. 3.

Next, the steps of recording processing of digital broadcast recording and playback apparatus 100 shown in FIG. 3 will be described using FIG. 5. In FIG. 5, in step (herein after referred to as "ST") 131, data broadcast update searching section 126 determines whether or not there is updating of broadcast data. In ST131, when it is determined that there is an updating event of broadcast data ("Yes"), the flow shifts to ST134, and, when it is determined that there is no updating event of broadcast data ("No"), the flow shifts to ST132.

In ST132, the user performs input operation from input section 101, input control section 121 determines whether or not there is input in a form or selection of link. When it is determined that there is input in a form or selection of link ("Yes"), the flow shifts to ST134. When it is determined that there is no input in a form or selection of link ("No"), the flow shifts to ST133.

In ST133, when digital broadcast recording and playback apparatus 100 is provided to a mobile terminal such as a mobile telephone, it is determined whether or not operations of other applications such as incoming call, outgoing call, call, call ending, e-mail reception, e-mail display, e-mail creation and alarm from a scheduler, are performed. When the operations are determined to be performed ("Yes"), the flow shifts to ST134, and, when the operations are determined not to be performed ("No") the flow shifts to ST135.

In ST134, recording and playback processing section 108 records in data accumulating section 109 the details of an updating event and the cue point of the transport stream where this updating event occurs. In ST132, when a link is selected by user operation, recording and playback processing section 108 also records the URI (Uniform Resource Identifier) of the content of the selected link in association with updating event information.

In ST135, recording and playback processing section 108 accumulates a transport stream in data accumulating section 109. Here, it is assumed that data broadcast content is recorded per transport stream, but any format and scheme are possible if data broadcast content is recorded in association with image and audio.

In ST136, it is determined whether or not the termination requirement of recording processing of digital broadcast recording and playback apparatus 100, such as a decrease in battery level, stop of broadcasting, out of space in the data accumulating section, reservation terminating time and recording stop request by the user, is fulfilled. When the termination requirement is determined to be fulfilled ("Yes"), the recording processing is terminated, and, when the termination requirement is determined not to be fulfilled ("No"), the flow shifts to ST131.

Figure 6:
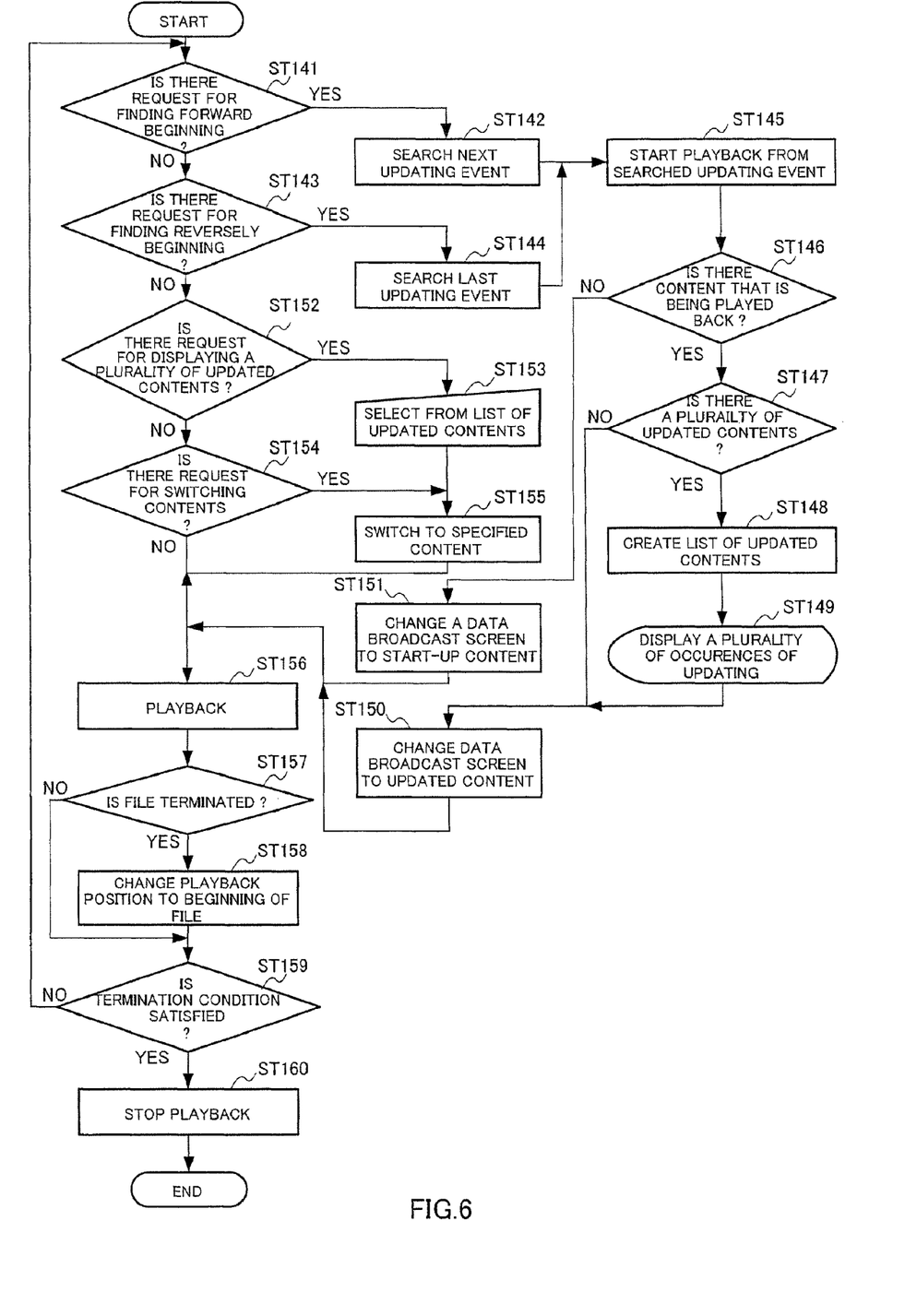
FIG. 6 is a flowchart showing steps of playback processing of the digital broadcast recording and playback apparatus shown in FIG. 3.

Next, the steps of playback processing of digital broadcast recording and playback apparatus 100 shown in FIG. 3 will be described using FIG. 6. In FIG. 6, in ST141, master control section 122 determines whether or not the user inputs a request for forward cueing of an updating event of broadcast data. If it is determined that there is a request for forward cueing ("Yes"), the flow shifts to ST142, and, when it is determined there is no request for forward cueing ("No"), the flow shifts to ST143.

In ST142, out of the accumulated files (transport streams), search is performed forward from the part that is currently being played back, and the part where the next updating event occurs (a cue point) is analyzed. Specifically, by searching for recorded updating event information, an updating event which occurs following the currently played back position is searched for, and the flow shifts to ST145.

In ST143, master control section 122 determines whether or not the user inputs a request for reverse cueing of an updating event of broadcast data. When it is determined that there is a request for reverse cueing ("Yes"), the flow shifts to ST144, and, when it is determined that there is no request for reverse cueing ("No"), the flow shifts to ST152.

In ST144, out of the accumulated files, a reverse search is performed from the part that is currently being played back, the part (time) where an updating event occurred last time is analyzed, and the flow shifts to ST145. In addition, time information of a non-synchronization message is described using a broadcasted time. Therefore, in ST142 and ST144, the part is analyzed by referring to time information included in an accumulated broadcast wave or by setting the beginning of the accumulated file as 0 and re-scaling time, so as not to cause contradiction. Further, when updating event information is recorded upon recording, by reading the updating event information from a recording table, it is possible to substantially reduce the time and power required for the search.

In ST145, a playback is started from the part searched for in ST142 or ST144, and, in ST146, it is confirmed whether or not the played back content exists after the updating event of the broadcast data (that is, whether or not all played back content is updated). When the played back content exists ("Yes"), the flow shifts to ST147, and, when the played back content does not exist ("No"), the flow shifts to ST151. Specific updating events include start and termination of a program, start and termination of broadcast data and deletion of the played back content.

In ST147, it is determined whether or not updating is for a plurality of contents. Specifically, it is determined whether or not there is updating of a plurality of contents or implementation of a plurality of contents by an event message. When it is determined that updating is for a plurality of contents ("Yes"), the flow shifts to ST148, and, when it is determined that updating is not for a plurality of contents, that is, updating is for a single content ("No"), the flow shifts to ST150.

In ST148, a plurality of updated contents are searched for, and a list is created from information such as a URI that specifies the searched contents. In ST149, icons or pop-up are used to display that a plurality of contents are updated.

In ST150, the content on the screen of the broadcast data is changed to the updated content. However, when there are a plurality of updated contents, one of the contents may be displayed by displaying content in an upper layer or content having small number of module identification information.

In ST151, the content played back in ST146 is determined not to exist after updating of the broadcast data, and therefore a display of the broadcast data is changed to first display content (start-up content), and the flow shifts to ST156. When the broadcast data is terminated, the playback of the broadcast data is stopped. Further, when only the playback of the broadcast data is performed, start-up content of first received broadcast data is displayed.

In ST152, when information reporting updating of a plurality of contents is displayed, it is determined whether or not a request for displaying a plurality of updated contents is issued by user operation. When it is determined that a display request is issued ("Yes"), the flow shifts to ST153, and, when it is determined that a display request is not issued ("No"), the flow shifts to ST154.

In ST153, it is determined that there is a request for displaying a plurality of updated contents in ST152, and therefore a list of a plurality of contents is displayed, a single content is selected by the user, and the flow shifts to ST155.

In ST154, it is determined whether or not there is a request for switching contents by user operation, that is, a request for shifting to another content based on the URI described in anchor information included in the content that is being played back. When it is determined that there is a switching request ("Yes"), the flow shifts to ST155, and, when it is determined that there is no switching request ("No"), the flow shifts to ST156.

In ST155, content is switched to the content specified in ST153 or ST154, and, in ST156, image, audio and broadcast data is played back.

In ST157, it is determined whether or not the file that is being played back in ST156 is terminated. When the file is determined to be terminated ("Yes"), the flow shifts to ST158, and, when the file is determined not to be terminated ("No"), the flow shifts to ST159.

In ST158, the playback of the file is determined to be terminated in ST157, and therefore the playback position is changed to the beginning of the file.

In ST159, it is determined whether or not the termination requirement of playback processing of digital broadcast recording and playback apparatus 100, such as a decrease in battery level and a playback stop request by the user, is fulfilled. When the termination requirement is determined to be fulfilled ("Yes"), the flow shifts to ST160, and, when the termination requirement is determined not to be fulfilled ("No"), the flow shifts to ST141.

In ST160, the playback of the file is stopped, and playback processing of digital broadcast recording and playback apparatus 100 is terminated.

Next, thumbnail processing for performing cueing by acquiring static image or dynamic picture image of a screen corresponding to an updating event of broadcast data, displaying a list of acquired static images or dynamic picture images (in a thumbnailed form), and selecting static image or dynamic picture image from the displayed list, will be described using FIG. 7.

Figure 7:
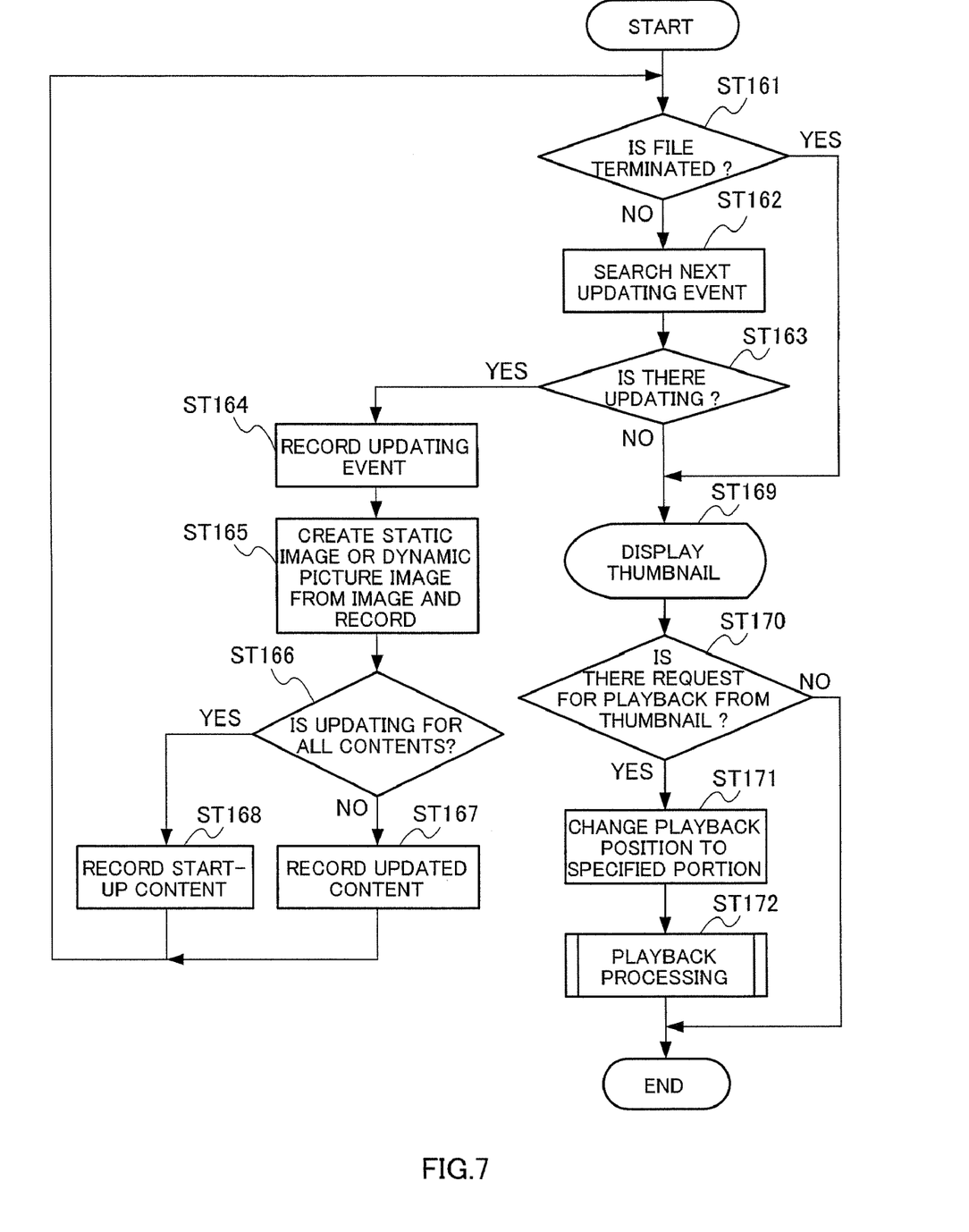
FIG. 7 is a flowchart showing steps of thumbnail processing of the digital broadcast recording and playback apparatus shown in FIG. 3.

In FIG. 7, in ST161, it is determined whether or not the playback of the file is terminated. When the playback is determined to be terminated ("Yes"), the flow shifts to ST169, and, when the playback is determined not to be terminated ("No"), the flow shifts to ST162.

In ST162, data broadcast update searching section 126 searches for the next updating event. In ST163, as a result of search in ST162, it is determined whether or not there is an updating event. When there is an updating event ("Yes"), the flow shifts to ST164, and, when there is no updating event ("No"), the flow shifts to ST169. When updating event information is recorded in data accumulating section 109, an updating event is searched for based on the recorded updating event information.

In ST164, an updating event is recorded in data accumulating section 109, and, in ST165, static image or dynamic picture image of a screen corresponding to the updating event is created and recorded in data accumulating section 109 in association with the updating event.

In ST166, it is determined whether or not the updating event searched for in ST162 is for all content. When the updating event is determined to be for all content ("Yes"), the flow shifts to ST168, and, when the updating event is determined not to be for all content ("No"), the flow shifts to ST167.

In ST167, the updated content and the updating event are associated and recorded in data accumulating section 109, and, in ST168, the start-up content and the updating event are associated and recorded in data accumulating section 109.

In ST169, a list of static images or dynamic picture images and broadcast data which correspond to an updating event (thumbnails) is displayed. In addition, it is possible to display broadcast data recorded as static image such as JPEG.

In ST170, it is determined whether or not there is a request for playing back static image or dynamic picture image selected from the list (thumbnails) displayed in ST169 by the user, that is, an updating event. When it is determined that there is a playback request ("Yes"), the flow shifts to ST171, and, when it is determined that there is no playback request ("No") thumbnail processing is terminated.

In ST171, the playback position is changed to the updating event selected by the user. In ST172, playback processing shown in FIG. 6 is performed, and thumbnail processing is terminated.

By performing thumbnail processing in this way, the user can confirm an updating event of broadcast data from a displayed list, that is, confirm image to be cued from a displayed list, so that the user can find a desired cue point at ease.

According to this embodiment, by searching for updates of broadcast data, recording the searched updating events of the broadcast data, and selecting one of recorded updating events, the broadcast data can be played back from the selected updating event, so that it is possible to search for updated broadcast data at ease.

The embodiment has been described above.

A first aspect of the present invention provides a digital broadcast playback apparatus including: a data broadcast update searching section that, when a request for cueing broadcast data is acquired, searches for an updating event of the broadcast data; and a playback section that starts a playback from the updating event searched for by the data broadcast update searching section.

According to this configuration, by starting a playback from an updating event of the data broadcast content, it is possible to cue the broadcast data, and, if the data broadcast content is linked with a program, it is possible to cue the program at a break.

A second aspect of the present invention provides the digital broadcast playback apparatus in the above-described aspect, wherein, when details of the updating event indicate updating of all data broadcast content or when data broadcast content that is being played back is deleted, a display of the broadcast data switches to start-up content which is first displayed content.

According to this configuration, when all data broadcast content is updated, or, when data broadcast content that is being played back is deleted, it is possible to automatically display start-up content without user operation.

A third aspect of the present invention provides the digital broadcast playback apparatus in the above-described aspect, wherein, when the updating event of the broadcast data indicates updating of part of the data broadcast content, the updated data broadcast content is displayed.

According to this configuration, when part of the content is updated, the user can watch the updated data broadcast content immediately.

A fourth aspect of the present invention provides the digital broadcast playback apparatus in the above-described aspect, wherein, when the updating event of the broadcast data indicates updating of part of the data broadcast content, a list of the updated data broadcast content is created, the created list is displayed, and the user is allowed to select one of the data broadcast contents from the displayed list.

According to this configuration, by creating a list of updated data broadcast content and displaying the created list, even when a plurality of data broadcast contents are updated, the user can recognize the details and select data broadcast content.

A fifth aspect of the present invention provides the digital broadcast playback apparatus in the above-described aspect, wherein, when a request for cueing is received during a playback of the data broadcast content recorded in association with image information and audio information of a program, an updating event which occurs next is searched for, and a playback of image information and audio information upon occurrence of the updating event is started.

According to this configuration, by starting a playback of image information and audio information upon occurrence of an updating event of broadcast data for which a request for cueing is received, it is possible to cue image and audio with the broadcast data.

A sixth aspect of the present invention provides the digital broadcast playback apparatus in the above-described aspect, wherein, when there is no updating event from a part where a request for cueing is received to an end of a file, a playback is performed from the beginning of the file.

According to this configuration, when there is no updating event from the part where a request for cueing is received to an end of a file, it is possible to perform a playback from the beginning of the file.

A seventh aspect of the present invention provides the digital broadcast playback apparatus in the above-described aspect, wherein an updating event is detected from the recorded data broadcast content, and thumbnails that associate static images or dynamic picture images immediately after the updating event with the broadcast data are displayed.

An eighth aspect of the present invention provides the digital broadcast playback apparatus in the above-described aspect, wherein, when there is recorded updating event information, thumbnails that associate static images or dynamic picture images immediately after the updating event with the broadcast data are displayed based on the updating event information.

According to these configurations, by displaying thumbnails that associate static images or dynamic picture images of recorded data broadcast content immediately after the updating event with the broadcast data, the user can confirm a list of images to be cued, so that the user can find a desired cue point at ease.

A ninth aspect of the present invention provides the digital broadcast playback apparatus in the above-described aspect, wherein static image or dynamic picture image is selected from the displayed thumbnails, and thereby a playback is performed from an updating event of broadcast data corresponding to the selected static image or dynamic picture image.

According to this configuration, by performing a playback from an updating event of broadcast data corresponding to the static image selected from the thumbnails, the user can cue a desired point at ease.

A tenth aspect of the present invention provides a digital broadcast recording apparatus including: a detecting section that detects an updating event of broadcast data; and a recording section that records broadcasting including the broadcast data and records as updating event information details of an updating event of the data broadcast content by the updating event detected by the detecting section associated with a cue point of recorded data where the updating event occurs.

According to this configuration, by recording an updating event of data broadcast content in association with a cue point as updating event information and performing a playback from the recorded cue point, it is possible to perform cueing fast.

An eleventh aspect of the present invention provides the digital broadcast recording apparatus in the above-described aspect, wherein the recording section records updating event information where details of an updating event which occurs through user operation are associated with the cue point of the recorded data where the updating event occurs.

According to this configuration, when a display of broadcast data is changed by user operation, the user pays attention to the display of the broadcast data, and sometimes misses image of a program. Therefore, when an updating event of the broadcast data occurs through user operation, by recording the updating event information in the same way as described above, it is possible to cue the updating event upon playback.

A twelfth aspect of the present invention provides the digital broadcast recording apparatus in the above-described aspect, wherein a cue point of recorded data upon occurrence of interruption from other applications during recording of broadcasting including the broadcast data, is recorded as updating event information, and a playback is performed from the recorded part.

According to this configuration, when interruption from other applications occurs during recording of broadcasting including the broadcast data, such as incoming and outgoing calls, call, transmission and reception of e-mail, display or creation of e-mail and alarm from a scheduler, for example, by recording the position where interruption occurs, it is possible to cue the part the user missed because of occurrence of the interruption.

The present application is based on Japanese Patent Application No. 2005-010674 filed on Jan. 18, 2005, the entire content of which is expressly incorporated by reference herein.

INDUSTRIAL APPLICABILITY

The digital broadcast playback apparatus and digital broadcast recording apparatus according to the present invention provide an advantage of searching for updated broadcast data at ease, and can be applied to small mobile terminals such as mobile telephones and PDAs.

The invention claimed is:

1. A data broadcast playback apparatus comprising:
a receiving section configured to receive broadcasted data content, the broadcasted data content being different from a broadcasted program;
a recording section configured to record the received broadcasted data content;
an update recording section configured to record, when at least a part of the broadcasted data content is updated, a cue point corresponding to an updated part of the broadcasted data content;
an input section configured to receive a user input;
an update searching section configured to search for the cue point when a user-inputted request for cueing the recorded broadcasted data content is received; and
a playback section configured to start a playback of the recorded broadcasted data content from the cue point when the cue point is found.

2. The data broadcast playback apparatus according to claim 1, wherein the playback section is further configured to playback a predefined start-up content when all of the broadcasted data content is updated or deleted.

3. The data broadcast playback apparatus according to claim 1, wherein the playback section is further configured to start a playback of the updated data content from the beginning when a part of the broadcasted data content is updated but a user-inputted request for curing the recorded broadcasted data content is not received.

4. The data broadcast playback apparatus according to claim 1, wherein,
the update recording section is configured to record, when plural parts of the broadcasted data content are updated, plural cue points corresponding to the plural updated parts of the broadcasted data content, respectively,
the playback section is configured to display a list of the plural cue points corresponding to the plural updated parts of the broadcasted data content, respectively,
the input section is further configured to receive a user selection of a cue point among the plural cue points displayed on the playback section, and
the playback section is further configured to start a playback of the recorded broadcasted data content from the user-selected cue point.

5. The data broadcast playback apparatus according to claim 1, wherein,
the recording section is further configured to record a broadcasted program associated with the broadcasted data content, the broadcasted program including image information and audio information, and
the playback section is further configured to start a playback of the recorded program at a portion of the program corresponding to the cue point of the recorded broadcasted data content, when a user-inputted request for cueing the recorded broadcasted data content is received.

6. The data broadcast playback apparatus according to claim 1, wherein the playback section is further configured to start a playback of the broadcasted data content from the beginning when there is no update to the broadcasted data content.

7. The data broadcast playback apparatus according to claim 5, wherein,
the update recording section is further configured to record one or more cue points of the broadcasted data content in association with one or more thumbnails, respectively, wherein each thumbnail includes a static image or a dynamic image of the program corresponding to each cue point, and
the playback section is further configured to display the one or more thumbnails in association with the corresponding one or more cue points, respectively.

8. The data broadcast playback apparatus according to claim 7, wherein,
the update recording section is further configured to record details of the updated part as update event information, and
the playback section is configured to display the thumbnail associated with the updated part according to the recorded update event information.

9. The data broadcast playback apparatus according to claim 7, wherein,
the input section is configured to receive a user selection of a thumbnail among the one or more thumbnails, and
the playback section is further configured to playback the static image or the dynamic image of the selected thumbnail.

10. The data broadcast playback apparatus according to claim 1, wherein the update to the broadcasted data content is based on a user operation.

11. The data broadcast playback apparatus according to claim 1, wherein the update to the broadcasted data content is caused by an interruption request received from an application executing in the digital broadcast playback apparatus.

12. The data broadcast playback apparatus according to claim 1, wherein the update to the broadcasted data content is based on reception of broadcasted signals.

13. The data broadcast playback apparatus according to claim 12, wherein the update to the broadcasted data content is caused by one selected from a group consisting of: initial reception of the broadcasted signals, termination of the reception of the broadcasted signals, updating of a part of the broadcasted data content, updating of the entire broadcasted data content, reception of a synchronization message, and reception of a non-synchronization message.

14. The data broadcast playback apparatus according to claim 10, wherein the user operation comprises operation selected from a group consisting of: user entry of questionnaire, user voting, user entry of text, and user selection of a check box, all using the input section.

15. The data broadcast playback apparatus according to claim 11, wherein the interruption request is based on an event selected from a group consisting of: an incoming call, an outgoing call, call in progress, call termination, e-mail reception, e-mail display, e-mail creation, and an alarm from a scheduling application.

16. A method of data broadcast playback using cue points, the method comprising:
- receiving via an antenna broadcasted data content, the broadcasted data content being different from a broadcasted program;
- recording in a memory the received broadcasted data content;
- recording in the memory, when at least a part of the broadcasted data content is updated, a cue point corresponding to an updated part of the broadcasted data content; and
- playing back the recorded broadcasted data content from the cue point.

17. The method of data broadcast playback according to claim 16, further comprising:
- recording a broadcasted program associated with the broadcasted data content, the broadcasted program including image information and audio information, and
- playing back the recorded program from a portion of the program corresponding to the cue point of the recorded broadcasted data content.

18. The method of data broadcast playback according to claim 16, further comprising determining that at least a part of the broadcasted data content is updated upon receiving user updating of the data content via the input device.

19. The method of data broadcast playback according to claim 16, further comprising determining that at least a part of the broadcasted data content is updated upon receiving an interruption request from a call application, an e-mail application, or a scheduling application.

20. The method of data broadcast playback according to claim 16, further comprising determining that at least a part of the broadcasted data content is updated based on reception of broadcasted signals.

* * * * *